Feb. 7, 1961
C. REYNDERS
2,970,829
METHOD OF OPERATION OF A TOP-FIRED OPEN HEARTH FURNACE
Filed Nov. 26, 1954
2 Sheets-Sheet 1
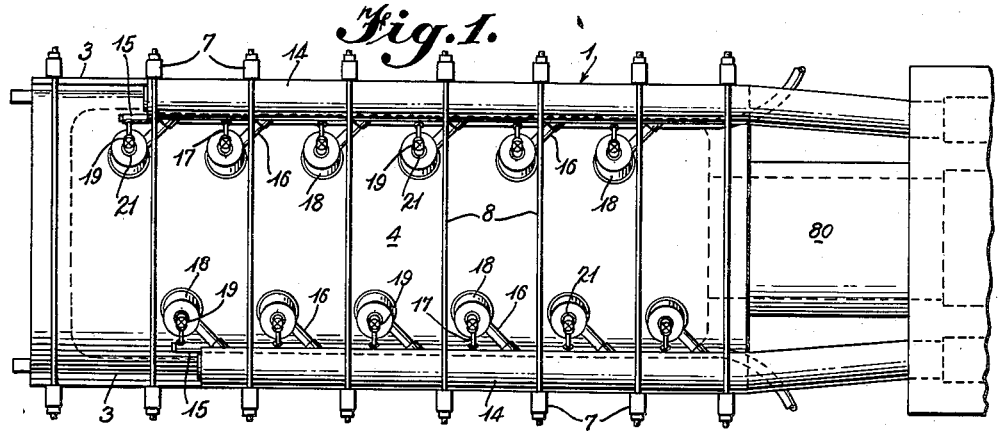
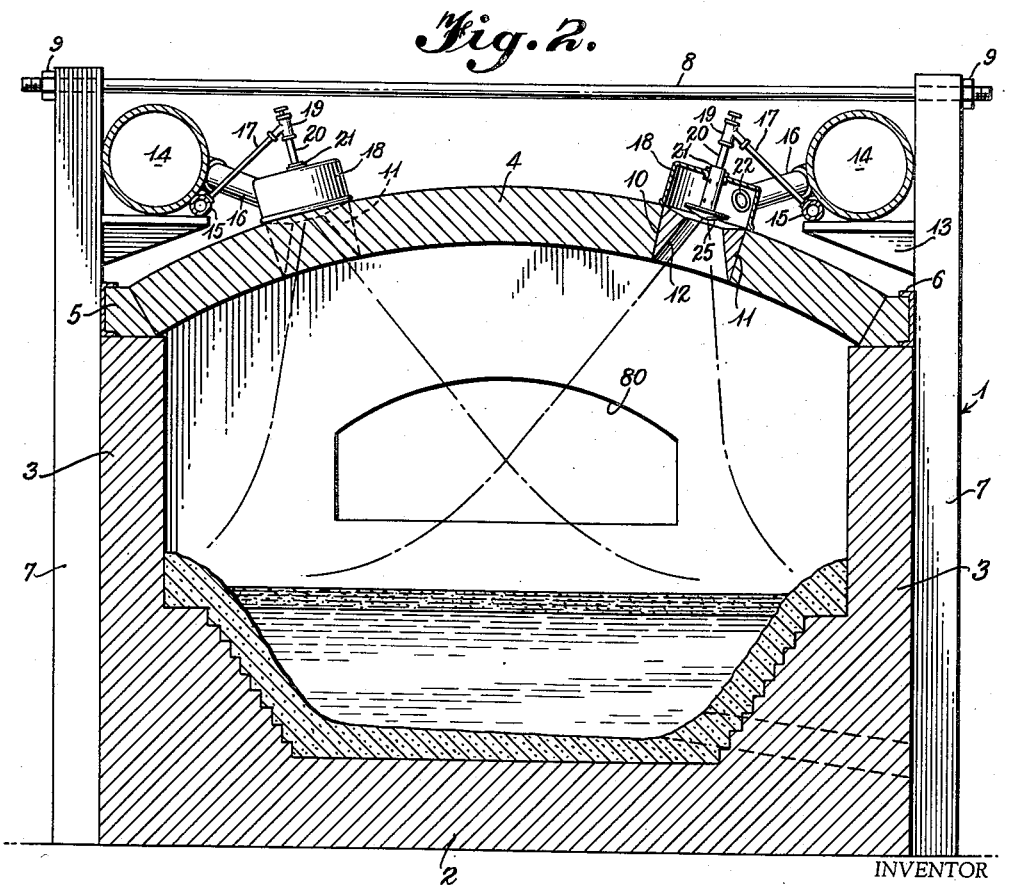
INVENTOR
*Charlton Reynders*
BY *Charles M. Thomas*
ATTORNEY Feb. 7, 1961 C. REYNDERS 2,970,829
METHOD OF OPERATION OF A TOP-FIRED OPEN HEARTH FURNACE
Filed Nov. 26, 1954 2 Sheets-Sheet 2

INVENTOR
Charlton Reynders
BY Charles M. Thomas
ATTORNEY

United States Patent Office 2,970,829
Patented Feb. 7, 1961

2,970,829

METHOD OF OPERATION OF A TOP-FIRED OPEN HEARTH FURNACE

Charlton Reynders, 179 Hinckley Road, Milton 87, Mass.

Filed Nov. 26, 1954, Ser. No. 471,135

4 Claims. (Cl. 263—52)

This invention relates to refractory-lined furnaces of the open-hearth type and more specifically to that particular class which is provided with roof burners from which the flanges are directed downwardly upon the surface of the charge in the furnace.

In its broad aspects, the furnace comprising the present invention has certain features similar to the open-hearth furnaces of the commercial art. It is designed and used, however, to obviate many of the inherent defects of previous top-fired open-hearth systems.

In the prior art, one of the greatest defects in furnaces of this type has been the rapidity with which the refractory materials generally used in the construction of the walls and roof of these furnaces have been deteriorated. The problem can be readily appreciated when it is considered that the metal tapping temperature range of an open-hearth furnace on low carbon steel is generally between 1585° and 1675° C. This upper temperature is close to the melting temperature of silica and other related wall materials. At this temperature, such materials will often combine with various products of the charge materials and cause rapid scorification of the refractories. It is imperative that a temperature of at least 1585° C. be used as a working temperature for low carbon steel since, when such steel is tapped, allowance must be made for a 50° C. fall in temperature in order to allow for temperature loss upon removal from the furnace. If the lower temperature limit is not observed, the charge will cool so rapidly as to prohibit further handling. And, for the reasons given, it is a commercial requisite that the upper limit in temperature be observed, for to go beyond that limit will cause financial loss by reason of burned linings and consequent replacement of the furnace refractories.

This problem of maintaining the life of the refractories used in commercial top-fired open-hearth furnaces has been appreciated but never heretofore solved by the industry. For example, in those commercial units tapping up to 100 tons per heat on carbon steels, it has been observed that the refractory loss was extremely high especially when the furnace temperature approached the limit referred to and assidual attention was given, not to flame velocities, but to the various metallurgical aspects of the problem such as the order and amounts of the charging limestone, the amount and type of ores used, the types of scrap, the charging of scrap and pig iron, control of slag, the carbon content sought and variations in the bath temperatures at various stages of the heat. These were among the prominent problems considered. Prior to this invention, those skilled in the art had failed to direct any attention to the significance of the flame velocities in furnaces of this type and, consequently, no successful method of reducing refractory losses has heretofore been devised.

It must be understood, when speaking of roof erosion, that various components of the FeO—$Fe_2O_3$—$SiO_2$ system are formed on the underside of a silica brick roof, principally ferrous orthosilicate, $Fe_2SiO_4$ or $2FeO \cdot SiO_2$, mineralogically known as fayalite and having a fusion point of less than 1200° C. The presence of components of the above ternary system on the roof, plus the presence of small quantities of $Al_2O_3$, $Na_2O$, $K_2O$ depresses the temperature of fusion of the roof surface to such a point that there is relatively rapid roof erosion.

Thus, with the foregoing in mind, it will be seen that the fundamental purpose of my invention is to provide a furnace operation that will prohibit the excessive losses in refractory linings that have heretofore been a common hindrance in the art, and the cause of considerable commercial expense in furnace operations of the nature described.

A further object is to provide a process for open-hearth melting operations which is effective in the control of roof temperatures in such furnaces and which will prevent the entrainment of particles of the substances heated with a resultant fusion of the same with the furnace walls and roof, thereby causing substantial roof and wall deterioration.

It is a still further object of this invention to provide a top-fired open-hearth furnace which will function over a wide range of temperatures with maximum efficiency of heating capacity and minimum heat loss and which may or may not be used with preheating of the medium supporting combustion.

It will be understood that the invention herein disclosed, although particularly applicable to the manufacture of steel and related products, the production of ferro-alloys, and the reduction or treatment of ores, may be extended to other fields of use such as copper, nickel and their alloys, where relatively high, but controlled, temperatures are desirable.

In accomplishing the objects hereinbefore recited, I have found, firstly, that the velocity of the flame in such furnaces is a factor of extreme significance; secondly, that the height of furnace roof above the bath is of vital importance when controlling the flame velocity; and, thirdly, that there is a definite correlation and ratio between such roof height and flame velocity.

A better understanding of the inherent features of this invention may be had by reference to the accompanying drawings in which like figures refer to like parts of the apparatus.

Figure 1 is a plan view of the structure illustrated in Figure 2;

Figure 2 represents a cross-sectional view of a furnace apparatus capable of carrying out the process;

Figure 3 is a detailed cross-sectional view of one of the burners illustrated in Figure 1; and Figure 4 is a modification of the burner structure illustrated in Figure 1, disclosing dual air manifolds.

Referring more particularly to the drawings, 1 designates a furnace of the top-fired open-hearth type. It is provided with the usual base of refractory materials 2 and side walls 3. The roof, as is usual in furnaces of this type, is arched as at 4 and is provided with two skewback bricks 5 as end supports. The said bricks 5 are, in turn, supported by two skewback channel sections 6. The walls 3 are retained in place by buckstays 7 which are firmly maintained in position by the common form of tie rod 8. The tie rods are, of course, provided with any usual expedient for retention of the same in the desired position, such as a large nut 9 threaded over the ends thereof.

The roof is provided with suitable openings 10 adapted to receive burner blocks 11, usually made of some type of silica refractory material. The burner blocks also have an angular opening 12 which may be better described as the burner port.

Referring to Figure 1, it will be seen that there is only one air manifold at each side of the furnace, as at 14. The fuel manifold is indicated at 15 and both of the manifolds are supported in any suitable manner, such as by an angular rack 13. The air manifold 14 has a line 16 with which air is supplied through an opening 22 (Figure 2) into the burner housing 18. A line 17 from the fuel manifold 15 conducts the fuel through a suitable type of valve 19, by which the fuel supplied may be regulated, thence through line 20 to the burner proper.

Reference to Figure 3 indicates that fuel line 20 is provided with a small opening at its extremity 20a and is surrounded by an air jacket 21. The lower portion of the jacket is preferably provided with an air deflector 25 which has an opening 26 through which fuel and the combustion supporting medium are emitted under pressure.

It will be seen that the apparatus thus far described refers to a furnace adapted to be used primarily in conjunction with gaseous fuels and provided with only one air or oxygen manifold and that the burner has been designed to operate by air under pressure from this one source.

A modification of the foregoing device, wherein primary and secondary air manifolds are disclosed, is illustrated in Figure 4. Here, the primary air manifold is designated at 40 and the secondary manifold at 41. It is to be understood that my invention contemplates, in the preferred process thereof, the supply of both a primary and a secondary combustion supporting medium as shown in this figure. As an alternate procedure, where two inlets are so utilized, it may also be desirable, in place of a combustion supporting medium, to inject steam at, for example, 100 lbs. p.s.i. through the smaller inlet line. In both cases, however, whether air or steam be used, its admission under pressure will produce an atomizing effect upon the fuel at its point of emission into the furnace through appropriate nozzles to be hereinafter described.

It is also to be understood that the use of steam is only appropriate where liquid fuel is employed, since it is obvious that where gaseous fuels, such as natural gas or coke oven gas, are used, the latter are supplied under pressure in suitable form for immediate combustion.

The primary manifold is provided with a line 42 leading to the burner jacket 43 and the secondary manifold is provided with a line 46 leading to a burner hood 45 which completely surrounds the said jacket 43. The lower portion of the jacket is preferably provided with a flame deflector 44, similar to that previously described. The oil manifold is shown at 47. The latter is provided with a vertical line 48, suitable connecting joint 49, and an additional line 50 which leads to a fuel controlling valve 51. The valve 51 allows oil under pressure to be emitted into line 52, the opposite extremity of which is provided with a small opening 53. Suitable entrances 54 are provided between jacket 43 and the opening 53 to permit a mixture of the combustion supporting medium and the fuel to be forced out of opening 55, in the deflector plate.

The burner here shown is supported in a manner previously described, namely, by means of a burner block 61 which is inserted into suitable roof openings 60. As indicated, these roof openings are angularly interposed with respect to the side walls of the furnace. The interior of the block is cut at an angle as at 62 to facilitate discharge of the products of combustion. The furnace roof is formed of refractory bricks. These units are, in turn, supported on each side by skewback bricks 72 and skewback channel section 73. The skewback bricks and channel sections 72 and 73, respectively, rest upon the side wall 71. Two racks are necessary for the manifolds hereinbefore described and are shown at 55 and 56. The walls of the furnace are supported by buckstays 75 which are, in turn, held in place by the tie rods 76. A common nut 77 is employed to fit over the threaded ends of tie rods 76 and maintain the same in position.

Referring to the foregoing description of the various modifications of my invention, and particularly the plan view of Figure 2, it will be seen that the burners, generally indicated at 18, are positioned in a series of rows longitudinal with respect to the length of the furnace. Although only two rows of burners have been shown, this number may be exceeded. In any event, I have found it preferable that each individual burner in one of said rows be positioned in the furnace roof in staggered relation to its companion burner on the opposite side of the furnace wall. The purpose and advantages of so positioning these burners should be readily apparent. When in operation, the plane of flames from each set of burners will be directed angularly with respect to each other and downwardly upon the charge to be heated. When the burners are so positioned in staggered rows, then the top of the charge is effectively heated throughout and the flames being uniform, the charge is uniformly exposed to the same. If placed exactly opposite one another, it is apparent that the flames from each row of burners will be caused to collide with those of the opposite row. The products of combustion will consequently meet at the center of the furnace and the change of direction of the flames will be directed vertically with respect to the plane of the charge. This will cause the entrapped oxides, sulfides and other inorganic components of the charge to impinge with force upon the roof refractories. Since such oxides generally form low melting point compounds with such of the usual brick refractories as contain silica, alumina and other related materials, the result will be to cause an immediate deterioration of the furnace roof between the two rows of burners. These disadvantages will tend to be eliminated by the staggering of the burners, as illustrated in the drawings, for then the flames will be evenly distributed and burned out over the hearth so that only products of combustion impinge upon the side walls as well as the roof, wtihout concentrating on any particular area.

I have also shown in my preferred example of the invention a positioning of the burners in the roof at an angle to the plane of the metal bath. With this angular positioning of each pair of burners, it is obvious that the resultant flames will be caused to flow from the side from which the individual flame emanates angularly from the roof and burns out completely in its transit across the entire width of the hearth, so that the products of combustion flow laterally along the opposite side wall toward the outgoing port 80.

It is apparent also that my disclosure relates to open-hearth furnaces employing almost any type of refractory as the protective interior coating of the walls and roof thereof. Silica, magnesite, chrome and alumina compounds of silica constitute the usual type of refractory used. However, the benefits of my disclosure are as great when refractory furnaces are built of other types of fire resistant materials, such as those common to the art employing carbonates and silicates, or oxides of other basic metals.

It has been appreciated in the operation of top-fired open-hearth furnaces that this type sometimes exceeds the electric arc furnace in refractory life. But, additionally, by the employment of my invention, numerous quantitative tests have revealed that the control of flame velocity has more than double the life of the refractory material used.

On the other hand, where the operation of an open-hearth furnace has exceeded the limiting flame velocities set forth below, well over 40% of the refractory arch has disappeared in a single short run. In some commercial furnaces of the top-fired open-hearth type having a relatively low roof, the flame velocity has been measured in excess of 40,000 feet per minute. This extremely high velocity has been a cause of commercial loss through erosion by reason of the following factors:

The high speed of the flame tends to break apart the charge and entrain a high quantity of the small particles constituting the surface of the charge. These particles, generally consisting of a ferric oxide produced in the melting of steel, are caused to be swept with force and at high temperatures across the underside of the silica roof. Such particles, at the high temperatures employed, combine with the materials of the refractory roof to form ferrous orthosilicate (among other compounds in the $Fe_2O_3$—$F_2O$—$SiO_2$ system), mineralogically known as "fayalite," having a melting point of about 1200° C. Such a compound will fuse below the temperatures employed and disappear without forming stalacites or so-called stringers of this fused material upon the roof. The formation of the compound with its lower melting point is the primary cause for roof deterioration, in the manner I have previously described.

As stated, my invention comprises controlling flame velocities within such a range that the maximum metal temperature, hereinbefore stated as being 1675° C., can be reached and maintained without damage to refractories. The following scale will indicate the allowable maximum pressure velocity of the combustion air at the burner, which must not be exceeded in accordance with the height of the refractory roof above the bath:

| Height of roof above slag line: | Pressure velocity of combustion air, feet per minute |
|---|---|
| 4' roof to bath | Approximately 6,000 |
| 6' roof to bath | Approximately 13,500 |
| 8' roof to bath | Approximately 24,000 |
| 10' roof to bath | Approximately 37,500 |
| 12' roof to bath | Approximately 54,000 |

Correlation between roof height above slag line and speed of the flame per minute is, of course, variable depending upon the distance flame must travel before reaching the charge. In large furnaces exceeding 150 tons capacity, that speed may near 54,000 feet per minute. However, if this figure, in a furnace having a roof twelve feet above the bath, be exceeded substantially, the excessive speed will cause the entrainment of surface particles and resultant deterioration of the roof as I have hereinbefore mentioned.

Velocity, as indicated above, is the pressure velocity of the combustion air or oxygen or mixtures of air and oxygen at the mouth of the burner block. It can be regulated by various expedients, but I have found it preferable to use, as a method of control, control of the pressures of fuel lines and supporting combustion medium.

In the foregoing table, it will be seen that a simple mathematical relationship exists between incoming velocities and roof heights, both of these factors being rather easily determined. As an empirical standard, it may be stated that the maximum permissible pressure velocity of incoming combustion air in feet per minute varies directly as the square of the roof height above the bath level measured in feet. This relationship and this law of the squares is applicable to the foregoing table.

It may thus be said that, as the area of the flame core intercept on the bath increases, higher incoming velocities may be used without increasing surface velocities of gases over the bath. Thus, for example, with a cone 12' high and a 30° angle at the apex, the area of the base is 32 square feet, whereas if the cone is truncated at 6', the area of the base is 8 square feet. For a given surface velocity of gases over an area of 32 square feet on the bath, as compared to an area of 8 square feet on the bath, it is apparent that much lower initial velocity is required on the smaller area.

In the application of any such formula, as expressed in the above table, it is to be understood that various operating conditions and variables must be coordinated to reach the desired result. These considerations and variables, in addition to the velocity pressure of the primary air, include the following conditions:

(1) Pressure velocity of secondary air over the range from room temperature to 2000° F.

(2) Fuel rates from 150,000 B.t.u./hr./burner to 6,000,000 B.t.u./hr./burner.

(3) Rate of flame propagation at various fuel rates and air temperatures.

(4) The included angle of the flame from 10° to 30° or more, which affects the perimeter of the elliptical flame intercept on the bath, and thus the velocities of the waste gases in contact with the charge.

(5) The variation in the angle from the perpendicular at which the flame impinges on the charge.

(6) The size of particles of varying densities that can be entrained in a flow of gases of varying densities, varying temperatures and varying velocities.

(7) Determination of density and temperature gradients for incoming air, the developing flame and the products of combustion in their travel to the outgoing ports.

In the observation of these several variables, however, the aforesaid mathematical correlation between roof height and pressure velocity of combustion air is the controlling and critical factor. It is to be understood that air at any pressure and temperature moves at a velocity readily determined by formula. It acquires velocity due to pressure, and this is called pressure velocity such as referred to in the foregoing table and the foregoing mathematical relationship. The weight of air in a flame is by far the greatest component and readily subject to measurement and control, wherefore I have chosen, as stated, the pressure velocity of the combustion air at the throat of the burner block as a significant factor to be observed for operative success. Thus, the essence of the instant invention is proper correlation of the pressure velocity of the combustion air at the throat of the burner block with the height of the roof above the bath of metal.

A successful operation of my invention was accomplished in a 10,000 pound furnace adapted for the production of stainless steels. This furnace had a hearth approximately 5 feet by 12 feet in dimension, and was provided with seven burners set in a 9 inch silica brick roof. Four of these were in a row just back of a longitudinal center line and three in a row just in front thereof. The burner tips were four feet above the metal bath level. Preheated oil under pressure was supplied to each burner. Primary atomizing air, at 16 ounces per square inch or less, went to each burner where it was admitted through a three-quarter inch orifice set from one-eighth inch to three-eighths inch below the oil atomizing tip. The volume combustion air was preheated from 400° to 450° C. by a recuperator, which gave a continuous supply of air, as opposed to the reversals of direction of flow usually associated with regenerative brick checkerwork. The flow of preheated air was distributed to the two rows of burners by two manifolds, one at the front and one at the back of the furnace roof, with take-offs to each burner bonnet. The steel plate burner bonnets were lined with insulating brick to an inside diameter of 20 inches and an inside height of 18 inches. Through an opening in the top of the burner bonnet, the oil and primary air lines were admitted, while the open bottom rested on the roof of the furnace, surrounded by a sand seal. The preheated secondary combustion air was admitted at one side of the burner bonnet. The burner blocks, 9 inches in depth, were set in the roof on 30 inch centers in each row, the front and back rows being offset so that opposing flames could pass between each other. The burner blocks had a 9 inch diameter opening at the upper entering end, which tapered out to 15 inches diameter at the lower outgoing end. To the bottom of the burner spindle carrying oil and atomizing air was attached an 11 inch diameter deflector plate, which was set 1½ inches above the 9 inch burner block opening in the roof.

The rate of fuel consumption on this unit ran from 40 to 80 gallons per hour. The primary atomizing air pressure varied from 11 to 16 ounces per square inch, supplying from 10% to 20% of the total air requirement, while the secondary combustion air pressure varied with fuel input at various stages of each heat from 0.20 inch to 1.00 inch water column. It should be noted that in the operation of fuel-fired steel melting furnaces that it is usual to use a considerable excess of combustion air over the theoretical air requirement in various stages of each heat, which frequently amounts to an excess of 50%, occasionally to as much as 100%. Combustion air pressure velocities for 425° C. air varied from 2760 feet per minute to 6175 feet per minute, and these velocities were well within the safe range, as evidenced by the splendid refractory life obtained. On the first campaign of this furnace, the roof life was over 90 heats of stainless steel or ferro-chromium, on the second campaign over 110 heats. This was increased on subsequent campaigns to a maximum of 249 heats. In the melting of stainless steels, there is no action on the bath of molten metal, and heat transfer is effected through a highly reflective slag of low heat conductivity to a bath of relatively quiet metal moved only by thermal currents, unless stirred by a rabble.

The melting of stainless steels entails a very severe test of refractories, and a roof life of 249 heats on a 9 inch silica brick roof is convincing evidence that the burner pressure velocities employed in this instance were amply conservative.

Further reference to the drawings indicates that the structure used in the practice of my process encompasses an option on the part of the operator as to whether or not preheating of the combustion supporting substance be used. As illustrated in Figure 1, no preheating is required. The combustion supporting medium, whether it be air, air mixed with an enrichment of oxygen, or pure oxygen, may be submitted cold to the burners. In this practice, no preheating is used and this will lower the velocity with which the fuel and combustion air mixture is admitted to the laboratory of the furnace. It is apparent that if preheating is used, the combustion supporting medium previously being under pressure, such preheating will increase the pressure velocity and make steps necessary for controlling the pressure velocity to within the limits set forth in the table above before the medium is admitted to the burner. With the elimination of preheating, lower pressure velocities of the combustion air are obtained and the requirement for additional pressure control apparatus becomes less essential. When preheating is not so used as aforesaid, that stage may be replaced by such devices common in the art as waste heat boilers. The use of these in commercial operations can promote an additional saving factor in the operation of the furnaces, particularly where steam is needed for other plant operations.

Figure 4 indicates a modification of the process when practiced with preheating, at the option of the operator. If used, the waste heat boiler referred to may be dispensed with.

It will be understood that the foregoing principle of pressure velocity control is generally illustrative of the melting of steel, and the figures used have been employed with respect to this particular process. The principle is equally applicable, however, to the treatment or smelting of ores, the melting or treatment of other metals, and the heating of finely comminuted materials and further allied operations.

As many variations are possible within the scope of this invention, I do not intend the same to be limited in any manner except as defined by the appended claims.

I claim:

1. The process of heating ores and metals in a top fired, open hearth furnace provided with refractory walls and roof comprising directing a plurality of flames downwardly upon a charge of material in said furnace, maintaining fuel rates of from about 750,000 B.t.u./hr./burner to about 6,000,000 B.t.u./hr./burner, controlling the pressure velocity at the burner of an incoming combustion supporting medium into the furnace to maintain speeds in feet per minute not to exceed 6,000 feet per minute for a 4 foot roof height, and varying said speeds approximately directly as the square of the roof heights above the bath level measured in feet for furnaces of greater roof heights, whereby said velocity is maintained sufficiently low to prevent scorification of the refractories of said furnace.

2. The process of heating ores and metals in a top fired, open hearth furnace provided with refractory walls and roof comprising directly a plurality of flames downwardly upon a charge of material in said furnace, maintaining fuel rates of from about 750,000 B.t.u./hr./burner to about 6,000,000 B.t.u./hr./burner, maintaining the included angle of said flames from about 10° to 30°, controlling the pressure velocity at the burner of an incoming combustion supporting medium into the furnace to maintain speeds in feet per minute not to exceed 6,000 feet per minute for a 4 foot roof height, and varying said speeds approximately directly as the square of the roof heights above the bath level measured in feet for furnaces of greater roof heights, whereby said velocity is maintained sufficiently low to prevent scorification of the refractories of said furnace.

3. The process of heating ores and metals in a top fired, open hearth furnace provided with refractory walls and roof comprising directing a plurality of flames downwardly upon a charge of material in said furnace through burners supplied with primary and secondary combustion supporting mediums, maintaining fuel rates of from about 750,000 B.t.u./hr./burner to about 6,000,000 B.t.u./hr./burner, maintaining the pressure velocity of said secondary medium over the range from room temperature to about 2,000° F., controlling the pressure velocity at the burners of an incoming combustion supporting medium into the furnace to speeds in feet per minute not to exceed 6,000 feet per minute for a 4 foot roof height, and varying said speeds approximately directly as the square of the roof heights above the bath level measured in feet for furnaces of greater roof heights, whereby said velocity is maintained sufficiently low to prevent scorification of the refractories of said furnace.

4. The process of heating ores and metals in a top fired, open hearth furnace provided with refractory walls and roof comprising directing a plurality of flames downwardly through a series of burners upon a charge of material in said furnace, said burners being supplied with primary and secondary combustion supporting mediums, maintaining pressure velocity of said secondary medium over the range from room temperature to about 2,000° F., maintaining the pressure velocity of said flames at fuel rates of from about 750,000/B.t.u./hr./burner to about 6,000,000 B.t.u./hr./burner, maintaining the included angle of said flames from about 10° to 30°, and controlling the pressure velocity at the burners of said incoming mediums to the furnace to maintain speeds in feet per minute not to exceed 6,000 feet per minute for a 4 foot roof height and varying said speeds approximately directly as the square of the roof heights above the bath level measured in feet for furnaces of greater roof heights, whereby said velocity is maintained sufficiently low to prevent scorification of the refractories of said furnace.

References Cited in the file of this patent

UNITED STATES PATENTS

| | | |
|---|---|---|
| 1,812,563 | Simpson | June 30, 1931 |
| 1,925,942 | Simpson | Sept. 5, 1933 |
| 2,057,065 | Simpson | Oct. 13, 1936 |

OTHER REFERENCES

Trinks' Industrial Furnaces, volume Two, Second edition, copyright 1942, published by John Wiley & Sons, Inc., New York, N.Y., pages 66 and 75.

Handbook of Chemistry and Physics, 26th edition, p. 2220, copyright 1942, Chemical Rubber Publishing Co., Cleveland, Ohio.